United States Patent Office.

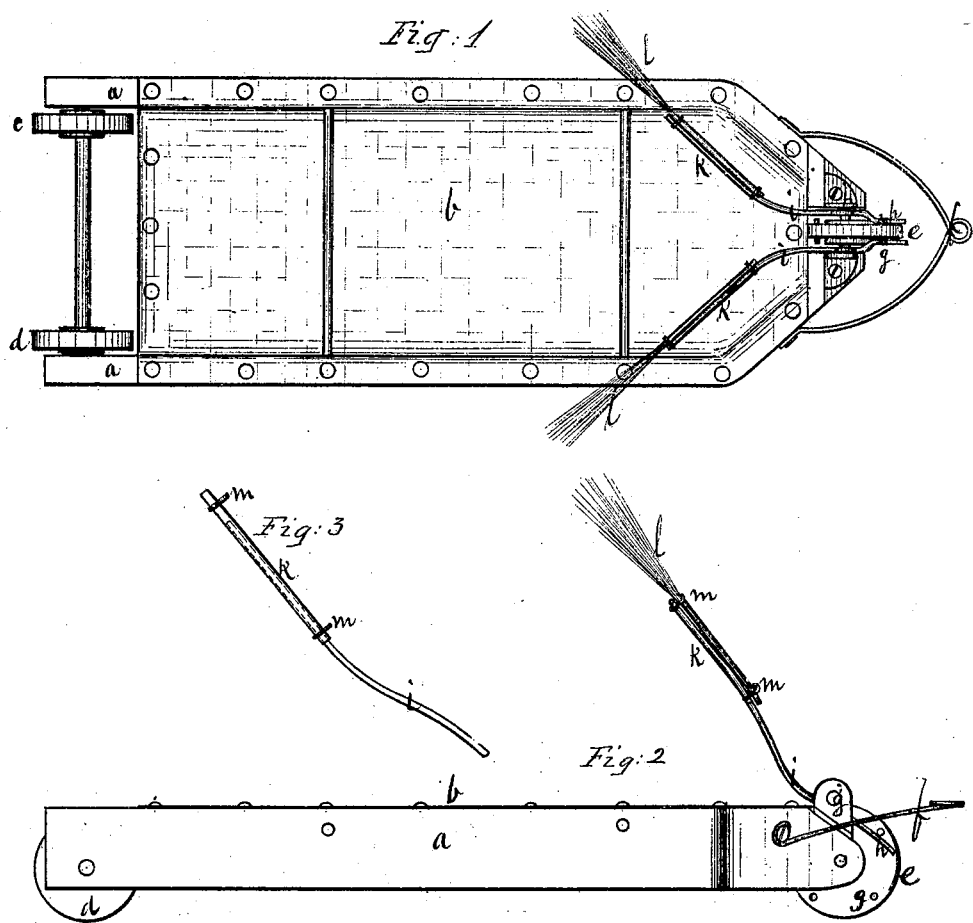

WILLIAM EWING, OF COLUMBIA, LOUISIANA.

Letters Patent No. 95,995, dated October 19, 1869.

IMPROVEMENT IN MACHINE FOR DESTROYING WORMS FROM COTTON-PLANTS.

The Schedule referred to in these Letters Patent and making part of the same.

*To all whom it may concern:*

Be it known that I, WILLIAM EWING, of the town of Columbia, Caldwell parish, in the State of Louisiana, have invented a certain new and useful Improvement in Means for Removing and for Destroying Worms and other Insects from the Cotton-Plant; and I do hereby declare that the following is a full, clear, and exact description of the same, reference being had to the accompanying drawings, and to the marks and letters thereon, which said drawings form part of this specification, and represent a machine or apparatus under which my invention may be carried out—

Figure 1 thereof being a top view of such machine;
Figure 2, a side view of the same; and
Figure 3, a view of one of the arms of said machine detached therefrom.

In each of these figures, where like parts are shown, like marks and letters are used to designate the parts.

It is well known to planters and cultivators of the cotton-plant, that scarcely a season passes over, in which material injury is not done to the crop by the cotton-worm. Generally the loss occurring by this source of damage, will amount to one-half, but in many seasons the entire crop is ruined.

Various efforts have, therefore, been made to destroy the cotton-worm.

On carefully studying the growth and habits of the cotton-worm, I ascertained that one of its leading instincts is to drop or throw itself off from the plant, upon moderate disturbance of the leaves and branches. It is upon this instinct that my invention is based; and My invention consists in the use of a machine or apparatus, so constructed that it may be drawn by hand, or by a horse or mule, between the rows of the plants, and agitating the leaves or stems, disturb the worms, and cause them to carry out their instinct, and drop or throw themselves off from the plants.

If such disturbance be made by any suitable means, the worms will usually drop to the ground, and where only a few acres are cultivated, reliance may be placed upon the destruction of the worms by the fowls or chickens of the plantation; but in large fields, some means for securing the worms, and removing them, will have to be resorted to. Such means are provided under my invention.

It will be seen, by reference to the drawings, that upon a frame *a*, constructed of wood, or other suitable material, is stretched or fastened canvas *b*, or some proper fabric, the frame having wheels *c d e* and a yoke, *f*, or drawing-device.

Upon the front wheel *e*, on either side, are pins *g*, which act upon the lower ends *h* of the arms *i* as the wheel is rotated. These arms are pivoted to plates *j*, and extend upward and outward, so as to pass along the sides and over the tops of the plants.

To the upper parts of these arms, other tubular arms, *k*, are affixed, so that the brushes *l*, secured thereto, may be adjusted, elevated, or lowered to the height of the plants.

These brushes are held in place by eyes or rings *m*.

Now, if the canvas *b* be smeared with tar, or any other material to which the worms will stick or adhere for a reasonable length of time, as the machine is drawn or pushed forward, the worms will be dislodged from the plants, and falling upon the smeared surface of the canvas, may easily be gathered up and destroyed.

The machine or apparatus here shown and described, is intended to be passed between two rows of the plants, and will not, therefore, be likely to catch all the worms that may be disturbed and fall. If to such machine, however, a light frame of wire rods or cane be attached to the side bars, and extending upward above the top of the plants, and thence down to near the ground, and there have a frame, to which canvas is affixed, two rows of plants will be operated upon at the same time, and all the worms be caught; or if two machines like that here shown be used, each travelling between two rows of the plants, and by some such frame-work as here named, have a canvas sack or bed between the intervening two rows of plants, then one or more rows may also be acted upon.

In this arrangement of the machine or apparatus, the brushes or their substitutes would have to be differently located from those here shown. Such difference of location and means for operating the brushes will readily occur to any individual desiring to construct a machine having these modifications.

What I claim as my invention, and desire to secure by Letters Patent, is—

A machine or apparatus, constructed substantially as herein recited, for the purposes set forth.

This specification signed, this 23d day of August, 1869.

WM. EWING.

Witnesses:
T. J. BROADWAY,
GEO. WEAR.